June 29, 1965
F. R. HINSON
3,191,678
METHOD AND APPARATUS FOR TREATING AN EARTH
FORMATION PENETRATED BY A WELL
Filed April 2, 1962
6 Sheets-Sheet 1
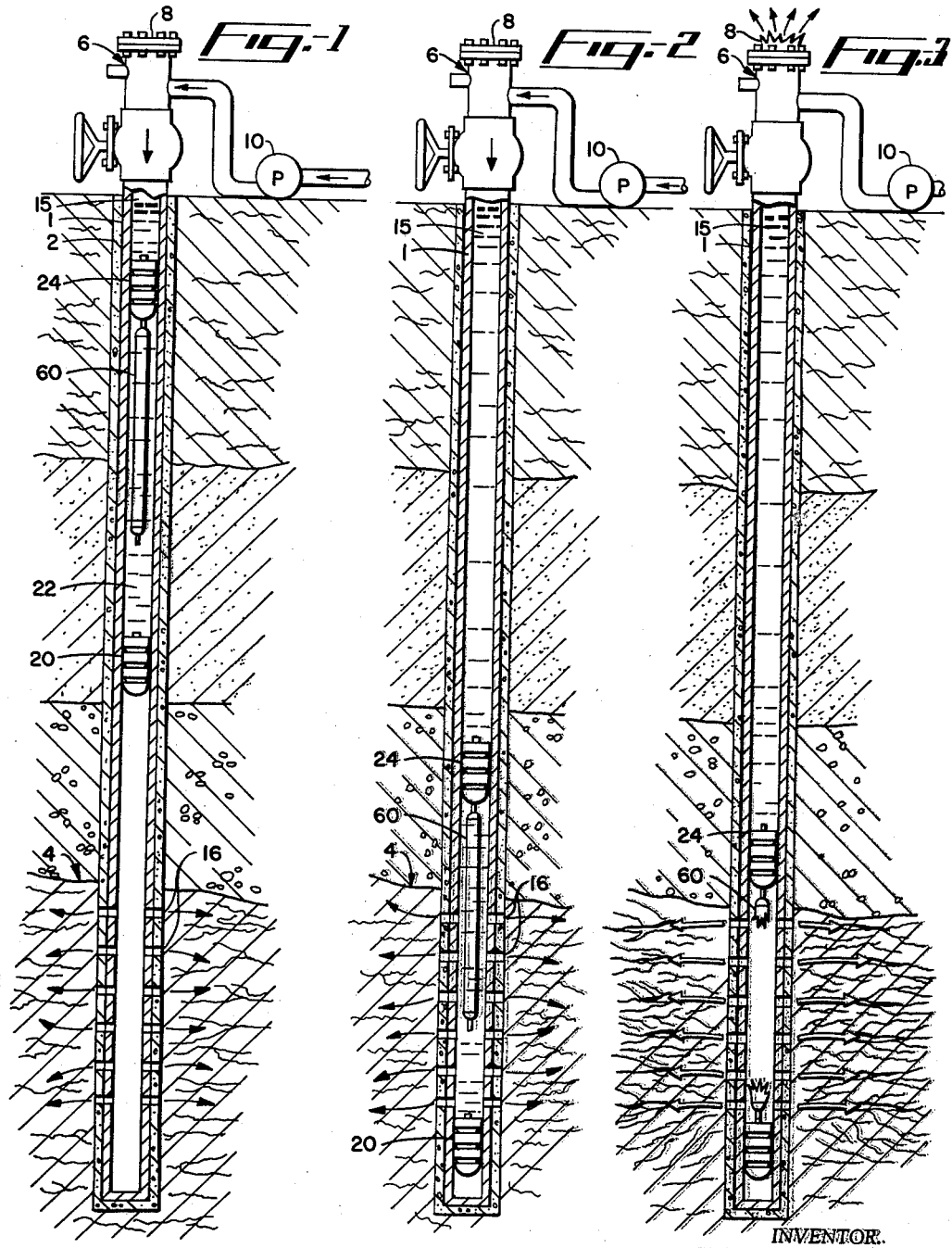
INVENTOR.
FOSTER R. HINSON
BY *Robert C. Brown*
ATTORNEY

INVENTOR.
FOSTER R. HINSON

BY Robert A. Brown

ATTORNEY

June 29, 1965    F. R. HINSON    3,191,678
METHOD AND APPARATUS FOR TREATING AN EARTH
FORMATION PENETRATED BY A WELL
Filed April 2, 1962    6 Sheets-Sheet 3
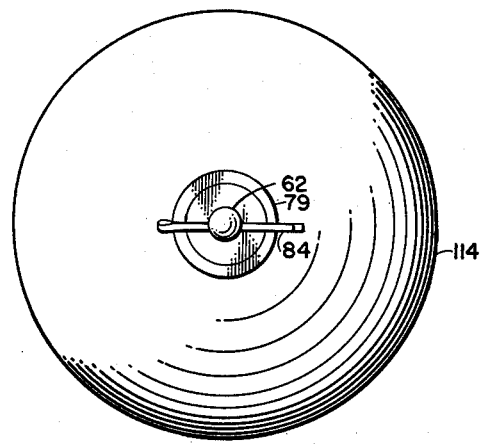
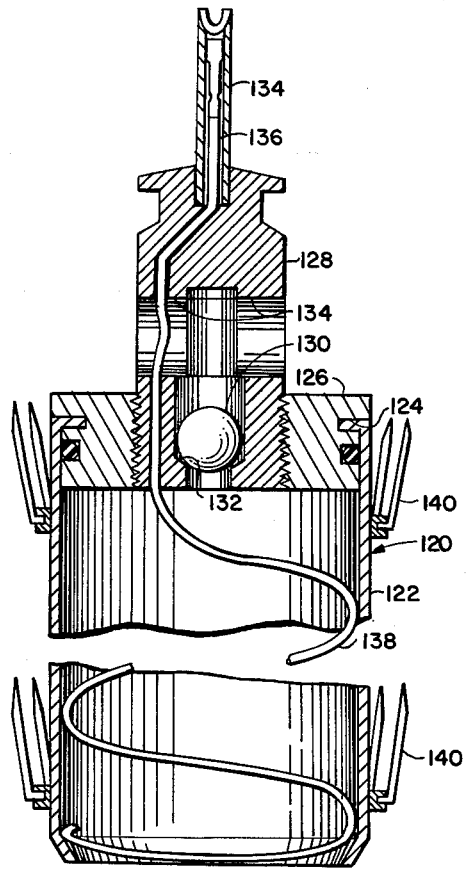
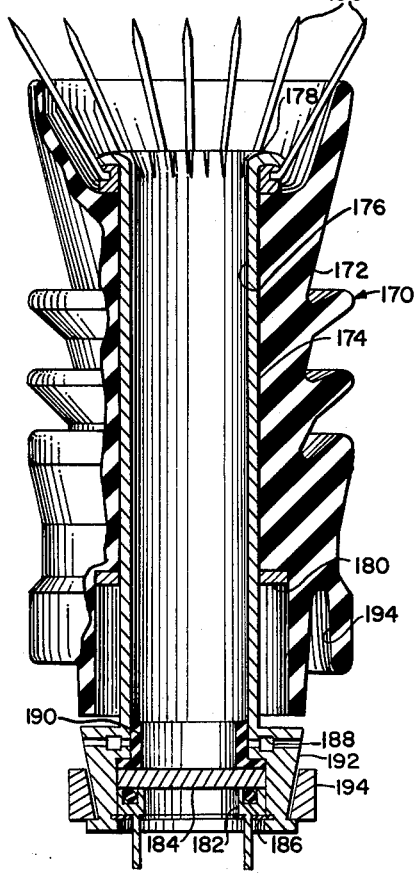
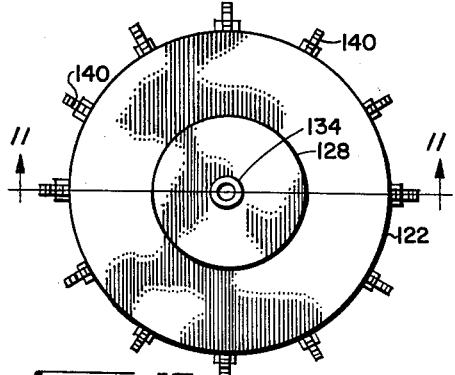
INVENTOR.
FOSTER R. HINSON
BY
ATTORNEY

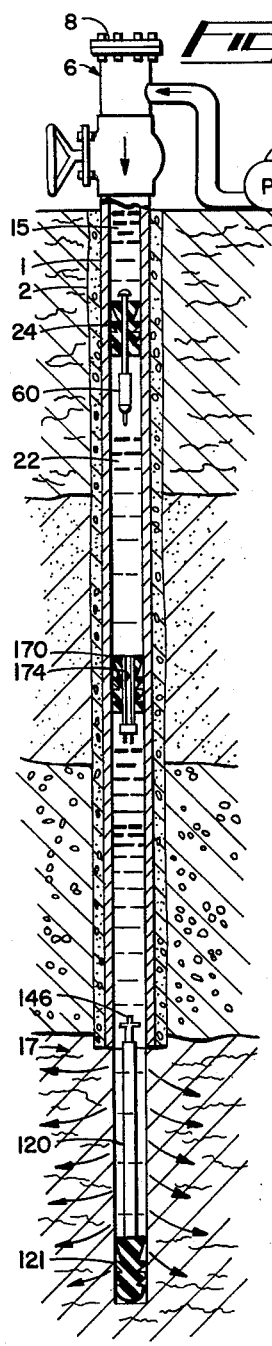
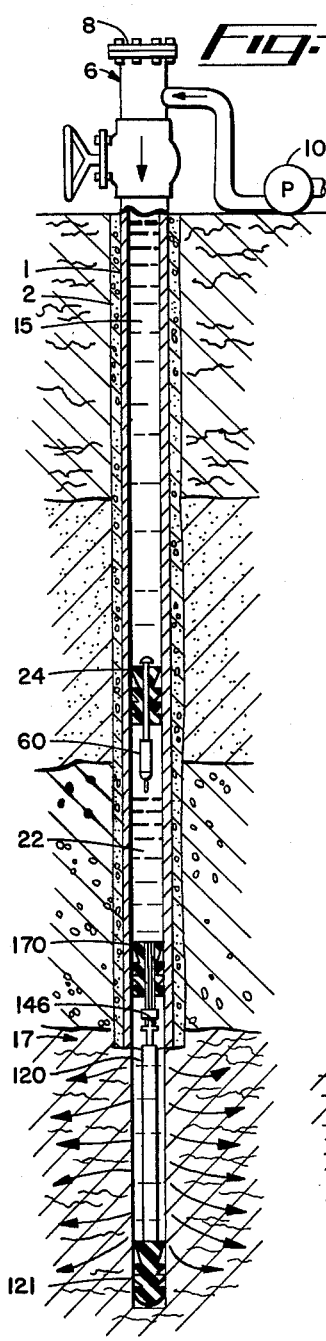
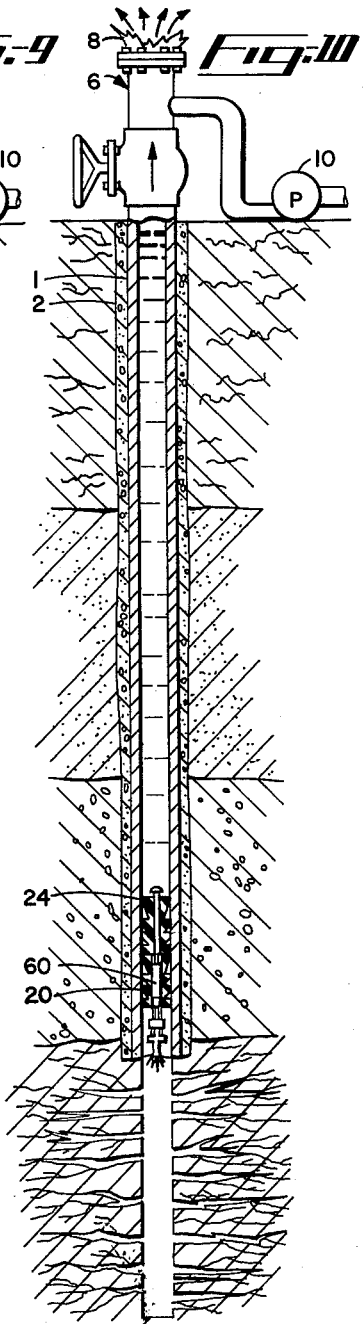
INVENTOR.
FOSTER R. HINSON

INVENTOR.
FOSTER R. HINSON

BY

ATTORNEY

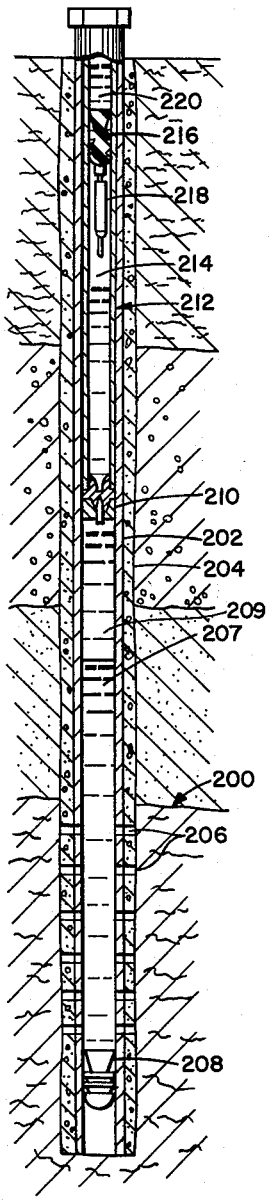
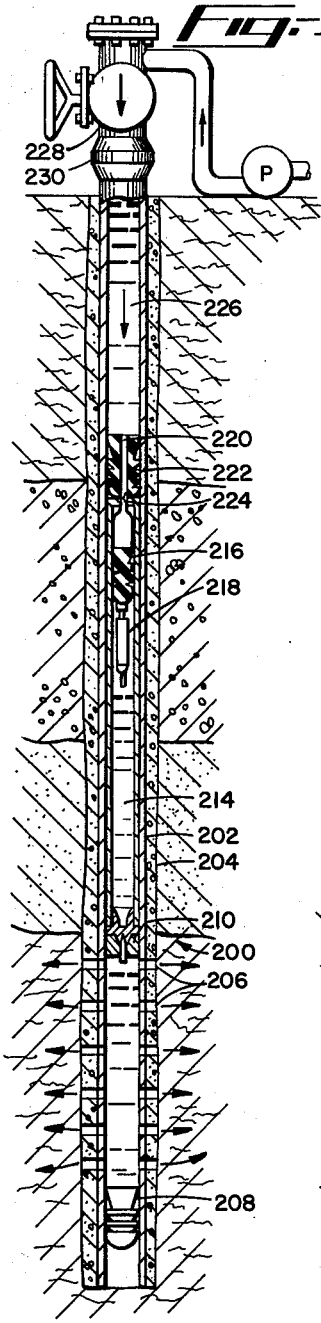
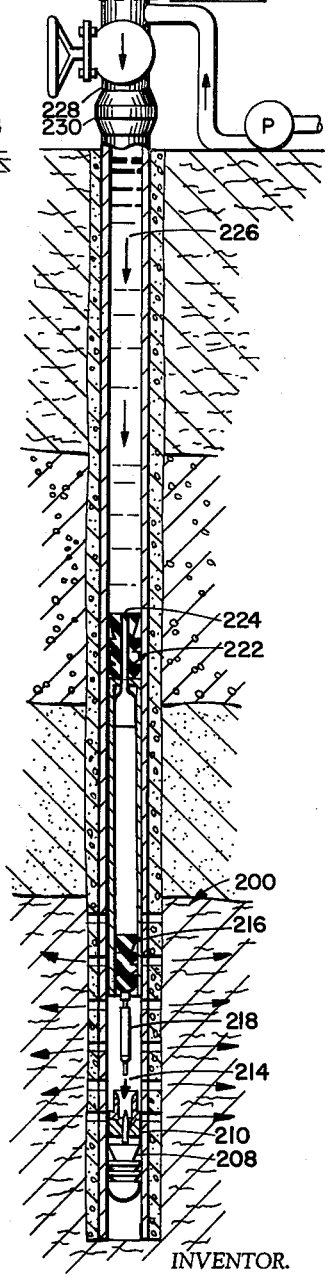
INVENTOR.
FOSTER R. HINSON
ATTORNEY

United States Patent Office 3,191,678
Patented June 29, 1965

3,191,678
METHOD AND APPARATUS FOR TREATING AN EARTH FORMATION PENETRATED BY A WELL
Foster R. Hinson, Houston, Tex., assignor to Aerojet-General Corporation, Azusa, Calif., a corporation of Ohio
Filed Apr. 2, 1962, Ser. No. 184,446
17 Claims. (Cl. 166—36)

This invention relates to a method and apparatus for treating an earth well and has for its primary object to increase the productivity of a formation which has been penetrated by a well.

Porous oil bearing formations are often of a compact or tightly cemented porous structure, as for example fine grain sandstone, porous or nonporous but fractured limestone, etc. These formations are sometimes of such low permeability that the rate of oil flow through the formation, which is exposed to the well, is negligible. In some cases even though a well penetrates a formation, the flow of oil may be small or practically zero although a large amount of oil is present in the formation. Asphaltic or waxy substances often clog the formation after production has begun.

Various methods have been proposed for increasing the productivity of oil producing formations adjacent the well bore. The most common procedure, for limestone, dolomite or other acid soluble formations, is an acid treatment. This process dissolves the formation in the existing flow channel walls in order to enlarge them.

Another common productivity increasing process is formation fracturing which is a hydraulic process aimed at parting a desired section of formation. Selected grades of sand or particles of other materials are added to fracturing fluid and varied quantities of these particles pack and fill the fracture acting as a propping agent to hold it open when the applied pressure is released. Such fracturing increases the flow channels in size and number improving the flow characteristics of the reservoir rock. Some of the fluids used in this process are crude oil for sand oil fracturing, special refined oil for sand oil fracturing, water for river fracturing, acid for acid fracturing, and liquid explosives for general applications. Explosive fracturing has recently been improved with new explosives, firing mechanisms, and procedures.

The acid treatment chemical solutions, when reacted with the formation surrounding the well, tend to react mainly with the more porous gas zones rather than the oil producing zones. These chemicals taking the paths of least resistance tend to enlarge the already existing porosity of the gas producing zones and do not create new openings through which the oil may secrete.

Hydraulic fracturing also has disadvantages since extremely high pressures are required to fracture the formations and this is of course limited by the type of equipment used and the depth of the well.

Explosive type fracturing methods are theoretically the most adaptable for formation efficiency increase but cause difficulty since the explosive has the tendency to destroy extensive portions of the well casing, detonate prematurely when the explosive is very sensitive, and make well operation hazardous.

In accordance with the present invention, much of the undesirable features of explosive fracturing are eliminated while retaining the advantage of hydraulic fracturing. The present invention positively forces the majority of the liquid explosive into the formatioin, and detonates the explosive only at the proper time. This invention keeps various fluids in the well casing separated regardless of their density.

Briefly, this invention relates to method and apparatus for an increase in the productivity of a formation penetrated by a well. According to the invention, a plug is placed into the well, a liquid explosive is placed in the well upon the first plug, and a second plug is placed in the well thereby isolating the liquid explosive between the two plugs. Pressure is applied to the second plug thereby forcing the two plugs and liquid explosive down the well. After the first plug reaches the formation to be treated, the liquid explosive will enter the formation. As the second plug reaches the first plug, the explosive is detonated, thereby fracturing the formation.

A liquid explosive which may be used in conjunction with the present invention can be made by sensitizing mono-nitromethane ($CH_3NO_2$) by adding a small percentage of an amine or mixture of amine sufficiently basic to form salts with a weak acid, either organic or inorganic. Specific examples of each sensitizer are analine, diethylamine, nitric acid or morpholine. The percentage of sensitizer to be used may be critical but could be varied from 1% by volume to as much as 40% by volume but is generally on the order of 2% to 3%. It is noted that the change in the sensitizer can affect the explosive impulse.

Such sensitized nitromethane is disclosed and claimed in the copending application of Edgar A. Laurence, Serial No. 605,747, filed July 18, 1945, now U.S. Patent No. 2,829,598, and assigned to the same assignee as the present invention.

Sensitized mixtures of nitromethane can be detonated by means of high velocity detonators such as some commercial blasting caps or "Primacord" (pentaerythritoltetranitrate).

Sensitized nitromethane can be transported with safety or since it is a simple matter to sensitize, this can usually be done at the job site. Thus the transportation may involve no "explosive" material but only two slightly "inflammable" materials, for which the usual precaution should be observed.

Other features and advantages not specifically enumerated above will be apparent after consideration of the following detailed description and the appended claims. The preferred form which the invention may assume is illustrated in the accompanying drawings in which:

FIG. 1 is a vertical cross section of an oil well during the step of pumping the liquid explosive down the well casing according to the present invention;

FIG. 2 shows the well of FIG. 1 during the step of forcing the liquid explosive into the oil producing formation;

FIG. 3 shows the wells of FIGS. 1 and 2 with the explosive entirely within the formation and detonation taking place;

FIG. 7 is a bottom view of the self-contained bomb illustrated in FIG. 6;

FIG. 8 is an alternative embodiment of the present invention in which a device is used to reduce the amount of explosive in the bore of the well and illustrated is a vertical cross section during the step of pumping the liquid explosive into the formation of the well;

FIG. 9 shows the well of FIG. 8 during the step of forcing the liquid explosive into the oil producing formation;

FIG. 10 shows the well of FIGS. 8 and 9 with the entire amount of explosive forced into the formation and detonation taking place;

FIG. 11 is a longitudinal cross section taken along line

Figure 14:
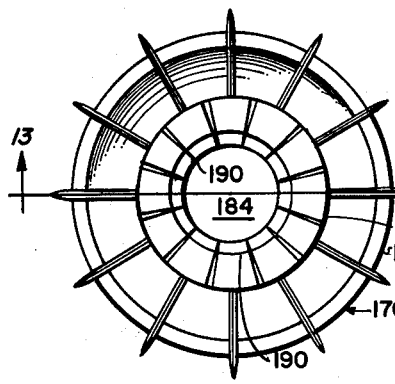
Figure 20:
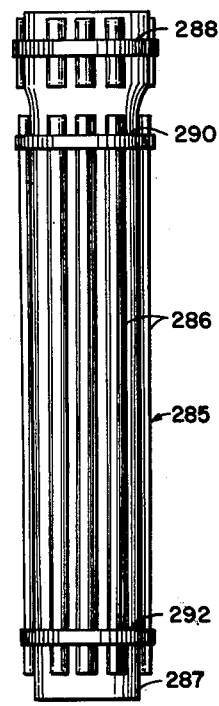
Figure 21:
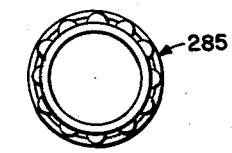
Figure 19:
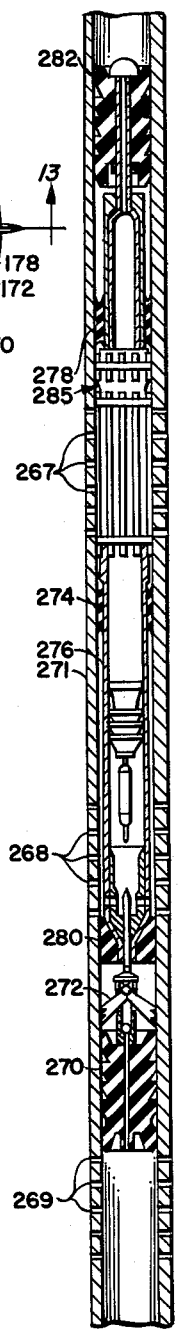
Figure 18:
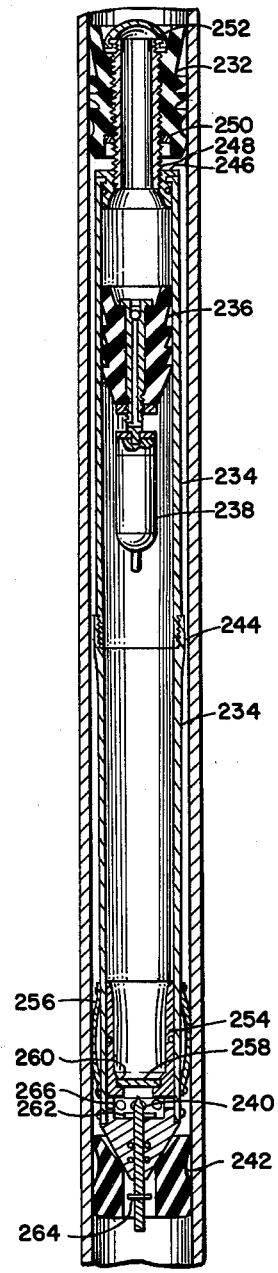

11—11 of FIG. 12 of a filler pipe used in the process illustrated in FIGS. 6–8, 15 and 16;

FIG. 12 is a top view of the filler pipe illustrated in FIG. 11;

FIG. 13 is a longitudinal cross section of a movable plug having a rupturable diaphragm therein and is used in the process as illustrated in FIGS. 6–8, and FIGS. 15 and 16 and is taken on line 13—13 of FIG. 14;

FIG. 14 is a top view of the movable plug illustrated in FIG. 13;

FIG. 15 is another alternative embodiment of the present invention in which liquid explosive is transported down a well without contacting the well walls, as illustrated in a vertical cross section of a well during the step of inserting all components into the well;

FIG. 16 shows the well of FIG. 15 with all the components being forced down the well;

FIG. 17 shows the well of FIGS. 15 and 16 with liquid explosive being forced into the formation immediately prior to detonation;

FIG. 18 is a longitudinal cross section of a device for transporting a liquid down a well without contacting the well walls, this device being particularly adaptable for use in the embodiment of the present invention illustrated in FIGS. 15–17;

FIG. 19 is still another embodiment of the present invention used to treat one of a plurality of perforated formations and illustrates a vertical cross section of a well in which a liquid explosive is being forced into a formation;

FIG. 20 is an elevation view of a bracing device particularly useful for supporting the explosive container illustrated in FIG. 19; and FIG. 21 is a plan view of the bracing device illustrated in FIG. 20.

Referring to FIGS. 1, 2, and 3, there is illustrated one embodiment of a "pumping method" for injecting fluid explosive into a well formation and detonating the explosive in situ. A well casing 1 is shown cemented in place as indicated at 2 with its lower end passing through the oil producing formation 4. A string of oil well casings extend from the top of the well to a point below the oil producing formation. A well head assembly 6 is attached to the casing 1 and has a rupturable disc 8 in its uppermost portion to relieve extremely high well pressures. Flushing fluids are pumped through the well head assembly 6 by the pump 10.

Although the present invention operates best in a cased well, it is within the scope of the invention to perform the same steps on cased wells having an "open hole" completion.

In the area of the oil producing formation 4, perforations 16 are made through the well casing by detonating a plurality of bullets or shaped charges in the area of the formation. A typical firing system and well perforator is illustrated and described in the patent to Throner 2,988,993 and assigned to the same assignee as the subject application. In the event that a well casing is not used in the area of the producing formation, conventional acid or hydraulic formation fracturing methods may be used to open the formations.

Prior to the commencement of the operation as illustrated in FIGS. 1–3, it is necessary to strip the well casing of rods and pump if present, tubing and well head. A wire line (not shown) is run into the casing to insure that it is open to below the perforations and that there are no tight or caved-in portions of the well casing. The normal hydrostatic head of the well is obtained at this time. A high pressure valve having an opening as large or larger than the casing is then installed at the top of the casing to act as a blowout preventer. Conventional apparatus such as an oil saver (not shown) is also added to the high pressure valve. The purpose of this phase of the operation is to pump a solid rubber plug down the casing with two to three barrels of fluid more than the calculated amount required to fill the casing, well head, and flow lines from the pump to the bottom of the perforations plus the amount of liquid explosive which will be used in the treatment. The fluid used is usually salt water. The plug is followed down the hole as it is pumped by a weight on the end of a measured line in order to accurately find or locate the plug. This knowledge combined with the exact depth of the perforation allows for the computation of the number of feet of perforations above the point where the plug stops. This footage plus two or three feet for possible difference in wire line measurements is the length to which the filler pipe is cut. The filler pipe is interposed between the contact sensitive bomb and the upper plug.

The wire line and oil saver are then removed from the well. The well is then swabbed from the casing until a depth approximately equal to the normal hydrostatic head of the well fluid is reached. Then one to four barrels of crude oil are dumped or pumped into the casing to act as a buffer or shield between the water below it and the liquid explosive which will be placed above it. A jellied oil may be used to coat the sides of the fractures in the formation in the event there is a high rate of fluid loss.

Referring now to FIG. 1, the process basically takes the steps of inserting a lower moving plug 20 within the well, depositing a liquid explosive 22 in the well upon the lower moving plug 20, and inserting an upper moving plug 24 to restrict the liquid explosive 22. Pressure is applied to the upper moving plug 24 to move both plugs and the liquid explosive in train down into the area of the formation. As shown in FIGS. 2 and 3, the liquid explosive 22 is forced into the formation 4 and thereafter the explosive is detonated to greatly increase the size and number of the fractures within the formation thereby increasing the production of the well.

Flushing fluid 15 is introduced through pump 10 and may be either fresh water, salt water, or crude oil. The choice is determined by the absence or presence of bentonite materials in the producing formation. This material tends to swell when exposed to fresh water and therefore limits the type of flushing fluid used when present. At the start of the pumping operation, the first few barrels of flushing fluid are eased into the casing as a precaution against a violent drop of the top plug 24 into the liquid explosive 22 in the event of an incorrect measurement. After a few barrels of flushing fluid have been pumped, every effort is made to raise the pressure on the casing to about 300 pounds below the rated rupture pressure of the rupture disc 8 in the well head assembly 6. The pump head pressure is increased until the exhaust side of the pump exceeds the capacity of the formations to take fluid under hydrostatic head of the well depth. At this point the maximum pressure which is possible to reach within the well casing below the limiting fracture of the rupture disc 8 in the well head assembly 6 is maintained through the remainder of the pumping phase of the operation.

Referring now to FIG. 2, the lower movable plug 20 has stopped due to the path of least residence, causing the liquid explosive 22 to be forced through the perforations 16 into the well formation 4. Actually the lower movable plug 20 will stop at a point opposite to the lowest perforation or open hole point which is taking fluid under pressure applied. The flushing fluid is continued to be pumped thereby forcing the liquid explosive 22 and the upper movable plug 24 downwardly until the entire amount of liquid explosive 22 is forced into the formation 4.

Referring now to FIG. 3, the detonation of bomb 60 with the lower plug 20 is shown. The contact of the stinger on the bomb 60 with the lower plug 20 will cause detonation of the explosive in the casing itself and within the formation. In those cases where the pump pressure is great enough, even a small charge within the casing is sufficient to cause the rupture disc 8 to shatter, the fluid flow to reverse and erupt up the casing 1. In most cases, after a short time the flow of flushing fluid will cease.

It is then necessary to check the casing with an open ended tool slightly less in diameter than the internal diameter of the casing to check for casing damage. If no damage is found, the hole is cleaned with a combination of spears, bailers, and a sand pump to below the level of the perforations or near the bottom of the open hole. In any event, common well cleaning procedures are conducted at this time. In the event that the casing is damaged, this damage must be repaired using standard casing repair techniques. Finally the well is swabbed until clean formation fluids are returned and the entire well is placed on the pump if necessary.

The purpose of the operation as illustrated in FIGS. 1–3 is to place an explosive into the formation to be treated. The detonation of the liquid explosive causes a multiplicity of fractures at all angles from the plane of the original fracture. After the detonation of the explosive, the debris from the explosion causes the fractures to prop themselves open thereby increasing the effective permeability and drainage area from the producing formation.

It should be noted that there are disadvantages connected with the process as illustrated in FIGS. 1–3. This disadvantage lies in the unpredictable point at which the bottom movable plug 20 will stop as it is descending down the casing 1. It is certainly possible that the plug will stop after passing only a few inches into the perforated zone or conversely, it might pass through the entire zone and then stop at the end of the zone thereby leaving the entire area, which has been perforated open, to allow the liquid explosives to flow therethrough. When using a liquid explosive such as sensitized nitromethane, it is axiomatic that the explosive must not be diluted by well fluids or flushing fluid in order for an explosion to be propagated. For this reason the length of the bomb used must be of a sufficient length to cover the entire length of perforations as illustrated in FIGS. 1–3. This condition becomes a detriment in the case where the perforated area is several feet longer than the point below which the bottom movable plug is likely to stop. If the bomb is made long enough to cover the entire perforated area, and if the bottom plug stops just a few feet below the most permeable area of the productive formation, there will be enough liquid explosive outside the bomb extending up the casing above the producing formation to fracture an area of nonproducing formation. This condition will increase the probability of wrecking the cement sheath around the casing and increases the possibility of heaving shale into the casing causing production problems.

Figure 4:
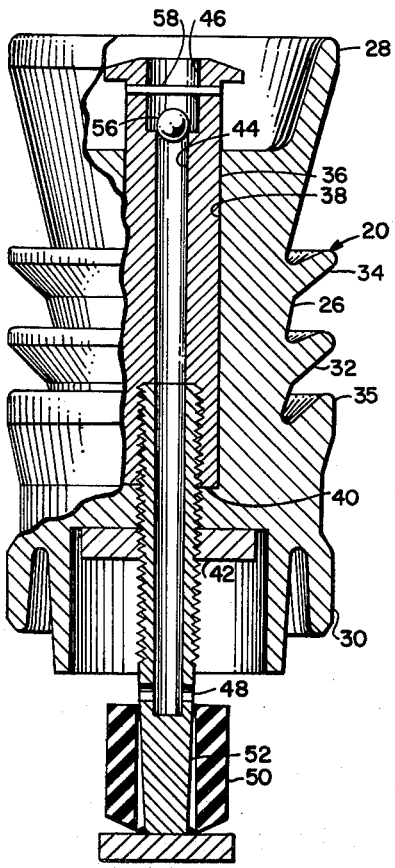
FIG. 4 is a movable plug shown partially in a longitudinal cross section.
Figure 5:
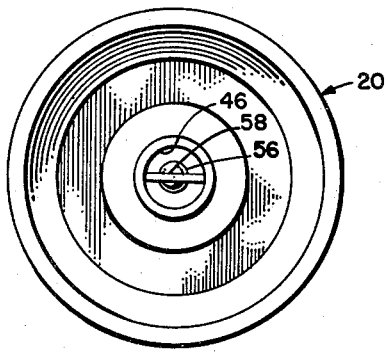
FIG. 5 is a top view of the movable plug shown in FIG. 4.

Movable fluid separating devices such as the plugs 20 FIGS. 4, 5 are employed for the method illustrated in FIGS. 1–3 as a means for sealing the well casing and allowing gas to pass in one direction while preventing liquid flow in any direction. Under proper conditions solid plugs can be used rather than the plugs illustrated in FIGS. 4 and 5. The generally cylindrical body 26 is construed of an elastomeric, aluminum, or resilient plastic material. A pair of outwardly directed annular projections 28, 30 are integrally formed on the body 26. These projections 28, 30 being pliable, are forced against the inner walls of the well casing by fluid pressure thereby tending to keep a seal in direct proportion to the fluid pressure. Ribs 32 and 34 project radially from the body 26 and aid in stabilizing the body under sealing conditions. A curved rib 35 positioned between the projection 30 and rib 32 also aids in stabilizing the body.

Pipe 36 extends lengthwise through the body opening 38 and is held therein by the flange 40 and the nut 42. Passageway 44 extends lengthwise through the pipe and terminates in an enlarged opening 46 at one end and a transverse opening 48 in the opposite end. An elastomeric collar 50 mates with the tapered nose 52. Obstructing the pipe passageway is a metal ball 56 received by the enlarged opening 46 and retained therein by the pin 58.

As the plug 20 is lowered into a well, pockets of entrapped gas or air below the plug may be exhausted through the plug by passing through the transverse opening 48, passageway 44, and forcing past the ball 56. Fluids above the plug 20 cannot pass therethrough since the ball 56 remains seated within the enlarged opening 46. When fluid is encountered on the lower end of the plug adjacent the projection 30, the collar 50 floats up and seals the transverse opening 48 in the pipe. In this manner well fluids found below the plug may be kept separate from the fluid introduced from the top of the well.

Plug, 24, illustrated in FIGS. 1–3, has a configuration and construction quite similar to plug 20 in FIGS. 4–5.

Figure 6:
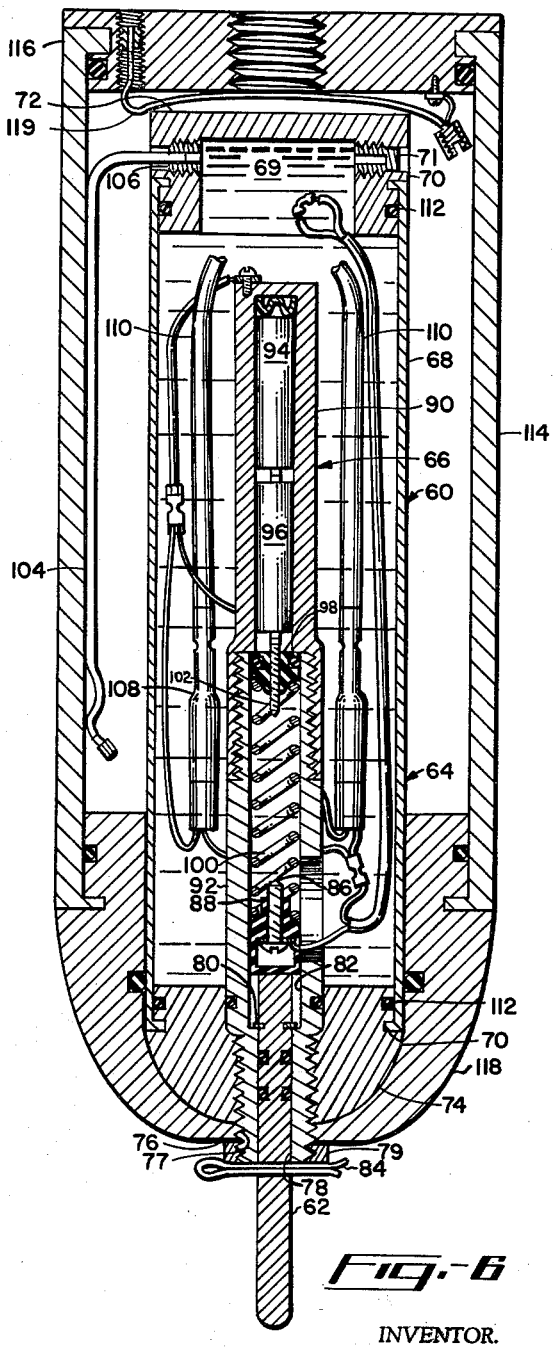
FIG. 6 is a longitudinal cross section of a self-contained bomb used in the process illustrated in FIGS. 1–3, FIGS. 8–10, and FIGS. 15 and 16.

A suitable means for detonating the liquid explosive as set forth in describing FIGS. 1–3, is attached to the lower portion of the movable plug 24. Referring now in particular to FIGS. 6 and 7, a means for detonating the explosive may be for example a pressure sensitive or impact sensitive bomb. The bomb 60 is encased within a filler pipe 114 and is attached thereto by the threaded nose 76 extending through the passageway and retained therein by the nut 79. In some cases the filler pipe 114 may be eliminated depending upon the size and type of operation and formation which is being treated. In regard to the method illustrated in FIGS. 1–3, the filler pipe length must be kept to a minimum in order to prevent an unusually large accumulation of explosive in the casing.

The bomb 60 comprises a stinger 62, a casing 64, and a power supply 66. The casing 64 comprises a hollow cylinder 68 having inwardly directed flanges 70 at both ends to retain the cap 72 and the stinger adapter 74 for sealing purposes.

The bullet shaped stinger 62 has a body portion that extends through a passageway 78 in the stinger adapter 74. A snap ring 80 that abuts counterbore 82 and the cotter key 84 prevent the stinger 62 from prematurely contacting the power supply 66.

A flexible expandable plastic pigtail 104 is in communication with the interior of the bomb and is held therein by a plug 106. This pigtail is filled with oil before complete assembly of the bomb and is used as an expandable diaphragm to equalize pressure.

The power source 66 is housed in the hollow cylindrical case 90 and the pipe shaped housing 92 threaded thereto. A pair of dry cell batteries 94, 96 are received by the case 90 and retained therein by the abutting plug 98 which may be made of suitable electrical insulation material. A coil spring 100 acting between the contact pad 86 and the plug 98 continually exerts pressure against the batteries to insure electrical contact. Contact 102 is fabricated from electrically conductive material and is in contact with the terminal of the dry cell 96. The adjustable contact pad 86 is threaded within an adapter 88 of suitable electrical insulation material that is in abutting relation with the stinger. A pair of blasting caps 108 are attached to two short pieces of Primacord 110 by conventional wiring and connected parallel to each other.

The interior of the bomb 60 is sealed from liquid pressure by a pair of O ring seals 112 inserted and in contact with the hollow cylinder 68 thereby preventing any fluid flow into the bomb. Liquid explosive 69 is poured into the interior of the bomb through an access port 71.

The filler pipe 114 is a fluid type container constructed of a cylinder having the ends crimped into grooves in the plug 116 and head 118. O rings are used throughout to create a fluid tight seal. A pigtail 119 is used as the flexible expandable diaphragm which is filled with oil before the top end is attached to the filler pipe and equalizes pressure inside and outside this device.

The cotter key 84 is removed from the transverse bore of the stinger 62 prior to the insertion of the bomb 60 within the well casing to render the stinger 62 operable to detonate the bomb 60. Upon contact of the stinger 62 with a device within the well such as a plug, the contact pad 86 is moved upwardly until it touches contact 102. In this position the electrical contact is complete thereby feeding current to the blasting caps 108 which thereafter detonate the Primacord 110 and liquid explosive 69.

The alternative embodiment as illustrated in FIGS. 8–10 is used to eliminate some of the problems which may occur when using the process as illustrated in FIGS. 1–3. In FIGS. 8–10, a process for increasing the productivity of a formation is illustrated and this process is best adapted for wells which have a lengthy perforated interval or a long "open hole" section. In the broadest aspects, this embodiment entails the basic method of moving the liquid explosive down the well as illustrated in FIGS. 1–3 plus limiting the volume of liquid explosive in the area of detonation.

Referring now to FIGS. 8, 9, and 10, the specific steps of the alternative embodiment will now be discussed. Prior to the conditions depicted in FIG. 8, the well is stripped to leave the bare casing and the fluid level is checked. A "rabbit" (not shown) is run to the bottom of the well to ensure a clean round hole and at this point a decision must be made on whether or not the casing can be loaded with a fluid. In the event that the well can be filled without a rapid loss of fluid, a filler pipe 120 is inserted into the well to limit the amount of liquid explosive which will be in the area of the producing formation. In the event that the well rapidly loses fluids, a means for sealing the well such as plug 121 is inserted prior to the introduction of the filler pipe 120, as illustrated in FIG. 8. The plug illustrated in FIGS. 4 and 5 may be used as a plug 121 for sealing the bottom of the "open hole" (FIG. 8).

After the lower movable plug 170 is inserted into the casing 1, a liquid explosive 22 is added upon the movable plug 170, and the explosive 22 is isolated by inserting a top moving plug 24 which is similar in configuration to the plug shown in FIGS. 4 and 5. A bomb 60 is attached to the lower portion of the top movable plug 24 as was discussed in relation to the process illustrated in FIGS. 1–3. It should be noted that the diameter of the bomb is less than that of the internal diameter of the pipe 174 used in the lower moving plug 170, see FIG. 13.

Referring now to FIG. 9, the flushing fluid 15 pumped by pump 10 forces the upper moving plug 24, the liquid explosive 22, and the lower moving plug 170 "in train" down the casing 1 until the projection 146 mounted on filler pipe 120 contacts the rupturable disc in plug 170. Projection 146 ruptures the disc in plug 170 allowing the liquid explosive 22 to flow into the formation 17. As the top moving plug 24 approaches the lower moving plug 170, FIG. 10, the bomb 60 enters the lower moving plug 170 until it contacts the projection 146 thereby detonating the bomb 60. In turn, the bomb 60 fires Primacord which is wound around the filler pipe 120 thus assuring the detonation of the liquid explosive 22 in the casing even though a small quantity of the explosive has become contaminated with well fluids.

A means for limiting the amount of fluid present in the well may be for instance the filler pipe 120 illustrated in FIGS. 11 and 12. Other suitable devices may be such things as ping pong balls, nonporous particles of plastic material, gravel, etc., although the filler pipe 120 is a preferred embodiment.

Filler pipe 120 is comprised of a tube 122 having its upper portion crimped into a groove 124 in the plug 126. Head 128 is threadedly received within plug 126 and contains therein a ball 130 mounted on seat 132 which allows gas, air or fluid to pass therethrough in an upward direction and pass out through ports 134. Conversely, fluids approaching the filler pipe 120 from the top of the well are retained and forced around the filler pipe since the ball seats and stops fluid movement in the downward direction through the filler pipe. This allows the filler pipe to become filled with well fluids and thereby force the passage of liquid passing from above around the outside of the pipe rather than through it.

A projection 134 is fixedly attached to the head 128 and has mounted therein a pressure cap 136 which fires when subjected to a pressure greater than ten thousand pounds per square inch. A length of Primacord 138 is placed in contact with the cap 136 and is directed downwardly through the entire length of the filler pipe 120. Pressure cap 136 and Primacord 138 ensure the continuity of explosive pressure wave from detonating sources downwardly even in those cases where the liquid explosive surrounding the filler pipe is made insensitive through contamination with oil or other well fluids.

A plurality of centralizer wires 140 are attached to the exterior of the pipe 122 and function as "hold downs" in case that the filler pipe 120 is subjected to a force in the upward direction from fluid flow within the well.

Another movable fluid separating device such as the flexible plug 170 illustrated in FIGS. 13 and 14 acts as a means for sealing the well casing, allowing gas to pass in one direction, and preventing fluid flow in any direction. Plug 170 is particularly useful in the process illustrated in FIGS. 8–10.

Plug 170 has a cylindrical body 172 having a configuration which is quite similar to the plug illustrated in FIG. 4 and may be constructed from an elastomer, resilient plastic, or aluminum. Pipe 174 extending through the body passageway 176 is held in the plug by a flared portion 178 at one end and a ring 180 at the opposite end. Wires 196 positioned beneath flared portion 178 prevent upward movement of plug 170 beyond the first collar or point encountered. A rupturable disc 184 is interposed between a rubber gasket collar 190 and a seal adapter 182 which are all retained in place by a snap ring 186. A plurality of transverse positioned passageways 188, formed in the lower portion of the pipe 174, allow gas below the plug to force the rubber gasket collar 190 to flex slightly and thereafter pass through the pipe 174. The head 192 of the pipe 174 has a taper thereon which mates with the taper formed in the buoyant ring 194 which can float in an upward direction to close off the transverse passageways 188 in the pipe 174.

In operation, the plug 170 prevents fluid flow in either direction and allows gas to flow in an upward direction through the pipe 174. When the plug 170 encounters a fluid as it descends down the well, the ring 194 floats upwardly plugging the transverse passageway 188 in the pipe 174 and thereby prevents fluid flow. Conversely, if the plug 170 encounters a gas cavity descending down the well, the ring does not float but rather the gas passes through the transverse passageways 188 forcing the flexible gasket collar 190 away from pipe 174, and allows the gas to escape, since fluid pressure tends to force the gasket collar 190 against the transverse passageway 188.

Through field testing of the methods illustrated in FIGS. 1–3 and 8–10, it has been found that these methods are not applicable in all oil producing areas. Corrosion of cased wells is caused when acid sensitized nitromethane is used as the liquid explosive. Another detriment is the possible contamination of the liquid explosive while in the casing before reaching the producing formation. Also these methods are unable to selectively treat one of several producing zones in a single well.

A number of time-reaction tests have been executed using nitromethane sensitized with nitric acid in a steel casing. These tests were conducted in the dry condition or coated with crude oil and/or water. It was found that the explosive mixture has a slow reaction on steel and oil and that no detectable damage occurred over a twenty-four hour immersion. However, when casings had deteriorated to the point of having slow leaks or seepage through pits and corroded spots, the reaction was rapid and the small holes and fissures were greatly enlarged.

Depending on the amount of contamination, the effect of the explosive within the formation is greatly reduced therefore limiting the effect of the explosive upon detonation. It is entirely conceivable that the processes illustrated in FIGS. 1–3 and 8–10 are quite acceptable and adequate for use in improving production of formations in some parts of the world.

Referring now to FIGS. 15, 16, and 17, a method is illustrated having a means of transferring a liquid explosive from the top of the well to the pay formation without contacting the walls of the well or being contaminated by well fluids. A container is used as the basic method of transferring the liquid explosive along with a self-contained detonating device and a means for forcing the liquid explosive from the container in the pay formation.

FIG. 15 illustrates a well having a pay formation 200 that has been penetrated by a well casing 202 circumscribed by a cement sheath 204. Pay formation 200 is in communication with the casing 202 through the perforations 206. At the outset, the casing is cleaned of all drilling equipment and swabbed of excess well fluids. A means for sealing the casing such as the plug 208 is pumped down to the bottom of the zone of perforations 206. Plug 208 prevents the passage of well fluids and the liquid explosives below the sealed point. The well is swabbed again to a point well below the length of a container to be used to support the liquid explosive. In the event that water 207 is used as a pump-down fluid, the well must be swabbed to a lower point to allow room for a crude oil buffer 209.

A means for supporting a container or a weight holding plug 210 is inserted into the casing as illustrated in FIG. 15. This plug 210 must not move until pump pressure is applied to it. A means for transferring a liquid explosive such as the container 212 is inserted into the well just above the weight supporting plug 210. The cavity between the container 212 and the well casing is filled with a crude oil in order to support the container. A liquid explosive 214 is run into the container 212 and having added weight is allowed to settle upon the weight supporting plug 210.

A means for forcing a liquid as for example the plug 216 is inserted into the top of the container 212 along with a detonating means such as the bomb 218. The remaining area between the casing and the container is filled with crude oil 220. Slips are attached to the uppermost portion of the container 212 in order to hold it at the top of the casing in the event there is any slippage of the weight holding plug 210.

As illustrated in FIG. 16, a top plug 222 is attached to the upper portion of the container 212 and a passageway 224 therethrough provides communication between the interior of the container 212 and pumping fluid 226. A pair of swedges (not shown) are applied between the casing and the full opening valve 228. These swedges fit around the top plug 222 allowing the well head 230 to be put together without having to force the same diameter pipe into which the top plug is designed to fit. Upon assembly of the well head 230, pumps (not shown) are started and a pumping fluid 226 such as water is eased into the well. A slight pressure of approximately 50 p.s.i. is applied to the well to pump the container 212 and all plugs in train down the well casing 202. As the container and plugs move downwardly down the casing, the well fluids are forced into the formation as illustrated by the arrows in FIG. 16. As the weight supporting plug 210 approaches the bottom plug 208, the container 212 is perforated thereby allowing the liquid explosive 214 to flow out into the casing 202. Through the application of additional pressure upon plug 216, the liquid explosive 214 is forced into the formation 200. The weight supporting plug 210 stops moving as it contacts the bottom plug 208, however force is still applied to the plug 216 thereby jettisoning all the liquid explosive 214 from the container 212 and forcing it into the formation 200. Because crude oil or well fluids occupy all the space between the exterior of the container 212 and the casing 202, the liquid exposive 214 has but one alternative but to follow the path of least resistance through the perforations 206 and into the pay formation 200.

As shown in FIG. 17, there is illustrated the condition of the well just prior to detonation of the liquid explosive. In this case a bomb 218 is used to be an impact or pressure sensitive device to be actuated upon contact with the weight supporting plug 210. This type of a device is used for expediency only and other types of detonating devices either self-contained or operable from the top of the well can certainly be used to detonate the explosive. Once the contact is made with the bomb 218, the shock wave of the explosion carries through the perforations 206 and into the formation 200, fracturing it to increase the productivity of the well.

A suitable means for transporting a liquid explosive from the top of the well into the pay formation is illustrated in FIG. 18. This transporting means comprises basically an upper plug 232, a pipe 234, an inner plug 236, and bomb 238, a means 240 for perforating the closed lower end of the pipe or container 234, and a weight supporting plug 242.

The cylindrical pipe 234 is constructed of one or more sections which are threaded together at joint 244 having the interior portion thereof of a uniform diameter to allow the inner plug 236 to move smoothly down the pipe 234 in order to force liquid explosive therefrom. Suitable pipe materials are such things as light weight metals as aluminum, magnesium, zinc, or high strength plastic such as polyvinyl alcohol which is a preferred material. In any event, the pipe material must be easily broken up with a bit and bailed or circulated out of the hole after a detonation of the liquid explosive.

At the upper portion of the pipe 234 is fitted therein a cap 246. A groove in the cap 246 receives a crimped portion of the pipe 234 thereby sealing the pipe 234 and preventing well fluids from contaminating the liquid explosive within the container. A centrally located threaded tube 248 is threaded into cap 246 and supports the top plug 232.

A resilient seal such as the upper plug 232 is mounted upon the threaded tube 248 and is retained thereon by a lower nut 250 forcing the seal in compression against an upper nut 252. The outer configuration of the plug is of conventional design.

The means for forcing the liquid explosive from the pipe or container is an inner plug 236 which is similar in configuration and construction to the plug illustrated in FIG. 4. A means for detonating the liquid explosive is for example the bomb having a structure illustrated in FIG. 6. Other examples of suitable means for forcing the liquid explosive from the pipe 234 are air pressure, fluid pressure, and a hydraulic piston-cylinder arrangement. Any conventional detonating means may be used although the self-contained bomb 238 is a preferred component because of its ease in operation.

A metal fitting 254 is inserted into the bottom-most portion of the pipe 234 and is retained therein by a plurality of pins passing therethrough. Centralizer wires 256 are attached to the exterior portion of the pipe 234 to prevent binding of the apparatus as it descends down the casing. Metal fitting 254 is closed by a rupturable disc 258 fitted within opening 260. Rod 240 functions as a means for perforating the disc 258 and is mounted within fitting 254. Reciprocation of rod 240 is limited by a collar 262 at its upper portion and a pin 264 adjacent its lower portion. Therefore as the pipe assembly moves down in train through the casing until it contacts a plug, the rod 240 will be pushed upwardly to perforate the disc 258 allowing liquid explosive contained in the pipe 234 to flow downwardly through the ports 266 in the fitting 254 and thereafter through the perforations in the casing and finally into the pay formation.

The lowermost portion of the fitting 254 has a conical shape which is of a slightly steeper angle than that formed on the weight supporting plug 242. This difference in shape is deliberately formed in this manner and as the pipe 234 assembly moves downwardly until it reaches the weight supporting plug 242, the steep angle on the fitting 254 will force the plug tightly against the casing thus preventing it from accidently moving downwardly and prematurely starting the downward movement of the liquid explosive. Once additional pressure is applied through a liquid being pumped down the casing, the pipe assembly will move in train including the weight supporting plug. It should be noted that other weight supporting means besides a plug of this particular configuration may be used, such as a simple perforated collar formed from a resilient material which may perform a similar operation. It should be further noted that although the pipe or container assembly appears to perform a particular operation, it can be used as a container of liquids either within or exteriorly of the oil well casing.

Referring now to FIG. 19, an arrangement is shown which can be easily adapted for increasing the productivity of a well having a plurality of perforated zones 267, 268, 269 in a casing 271. Substantially the same equipment is used in the present embodiment of the invention as that illustrated in FIGS. 15, 16, and 17 and is installed as set forth above. The only additional equipment required are a pair of isolation plugs and if necessary a means for supporting the container under extremely high pressure well conditions.

Referring to FIG. 19, a pump-down plug is inserted into the well in order to receive information on the pumping required and the condition of the casing. Once the pressure information is received, the pump-down plug is forced on the bottom of the hole. A resilient plug 270 having a pair of slips or dogs 272 attached thereto is accurately positioned between the second zone 268 and third zone 269 of perforations. This plug 270 is set by a conventional wire line (not shown) that actuates the dogs or slips at a desired level in the well.

A means for transmitting a liquid explosive such as the container similar to that discussed and illustrated in FIG. 18 is inserted into the casing 271. A first means for isolating a zone, such as for example a resilient collar 274, is forced over one joint of the pipe 276 at a point in the string calculated to be between the first zone 267 and second zone 268 with the pipe 276 positioned within the casing 271. In the event that distances are critical and the collar 274 does not fall in the right place, a backup (not shown) can be fixed to the pipe 276 and used in place of the collar to hold the plug. A second means for isolating a zone such as the resilient collar 278 is placed over the pipe 276 at points which will be above the first zone 267 of perforations.

The collars 274, 278 are constructed of a resilient material and are used to confine the liquid explosive as it is forced from the pipe 276 into the casing 271 to a zone 268 between the collar 274 and the weight supporting plug 280 thereby forcing it out into the second set of perforations. The second collar 278 is used to hold well fluid and pressure trapped between it and the upper top plug 282 above it.

As illustrated in FIGS. 20 and 21, a bracing device 285 may be used as a means for supporting the pipe 276 (FIG. 19) and may be for example constructed from a plurality of plastic half-round rods 286 held in place by a cylindrical body 287 and bands 288, 290, 292. Bracing device 285 enables the pipe 276 to withstand pump pressures. It is entirely possible that the bracing device may be eliminated in the event that the pipe 276 is constructed of such a material to withstand the particular pump pressure or if the interval between the collars 274, 278 is of such a size as to not require this support means.

The device for transmitting liquid explosive to one of several perforated zones in a well operates in a manner exactly as that disclosed above in describing the treatment method illustrated in FIGS. 15, 16, and 17. The additional equipment which is attached to the means for transmitting the liquid explosive makes it possible to isolate one or more perforated zones from adjacent zones.

Although a specific embodiment of the invention has been shown and described, it will be understood, of course, that it is only illustrative and that various modifications may be made therein without departing from the scope and spirit of this invention as defined in the appended claims.

I claim.

1. A method of increasing the productivity of a formation penetrated by a well comprising the steps of inserting a first plug into the well, pouring a liquid explosive upon the first plug, inserting a second plug attached to a pressure sensitive bomb into the well, applying pressure to the second plug until the first plug reaches a predetermined level, and applying further pressure to the second plug until the bomb reaches the first plug and detonates, thereby detonating the liquid explosive.

2. A method of increasing the productivity of a formation penetrated by a well comprising the steps of inserting a bridging plug at a desired depth in the well, depositing a liquid explosive in the well, inserting a movable plug having an attached impact sensitive stinger into the well, filling the well above the movable plug with a flushing fluid, and increasing the pressure on the flushing fluid to move the movable plug downwardly in the well until substantially all the liquid explosive is forced into the formation and the stinger contacts the bridging plug, thereby detonating the liquid explosive.

3. A method of detonating a liquid explosive in a well formation comprising the steps of inserting a filler pipe into the well at a desired depth, inserting a lower movable plug into the well, pouring a liquid explosive in the well upon the lower movable plug, inserting an upper movable plug into the well; forcing the upper plug, the liquid explosive, and the lower plug down the well until the lower plug contacts the filler pipe; forcing the liquid explosive through the lower plug around the filler pipe, and detonating the liquid explosive.

4. A method of increasing the productivity of a formation penetrated by a well comprising the steps of inserting a filler pipe into the well, inserting a fixed plug on top of the filler pipe, inserting a lower movable plug in the well, pouring a liquid explosive in the well upon the lower movable plug, inserting an upper movable plug in the well above the liquid explosive, forcing the lower plug, the liquid explosive, and the upper plug as a unit down the well downwardly until the lower plug contacts the fixed plug, forcing the upper plug until the liquid explosive is passed through the lower plug and around the filler pipe and further forced into the formation, and detonating the liquid explosive.

5. A method of increasing the productivity of a formation penetrated by a well comprising the steps of inserting a filler pipe into the well, inserting a fixed plug on top of the filler pipe, inserting a lower movable plug into the well having a rupturable disc therein, pouring a liquid explosive in the well upon the lower movable plug, attaching a bomb to an upper movable plug, inserting the upper movable plug and the bomb into the well; forcing the upper movable plug, bomb, and lower movable plug down the well until the lower plug contacts the fixed plug; applying pressure to the upper plug to cause the fixed plug to rupture the disc in the lower plug for forcing the liquid explosive through the ruptured disc in the lower plug around the filler pipe and into the formation, and forcing the bomb through the lower movable plug to contact the fixed plug, thereby detonating the bomb and the liquid explosive.

6. A method of increasing the productivity of a formation penetrated by a well comprising the steps of inserting a filler pipe into the well, inserting a fixed plug into the well on top of the filler pipe, inserting a lower movable plug into the well having a rupturable disc therein, pouring a liquid explosive in the well upon the lower movable plug, attaching a bomb to an upper movable plug, inserting the upper movable plug and the bomb into the well; filling the well above the upper plug with a flushing fluid; pumping the flushing fluid to force the upper movable plug, bomb, and lower movable plug down the well until the lower plug contacts the fixed plug; applying pressure to the upper plug to cause the fixed plug to rupture the disc in the lower plug for forcing the liquid explosive through the ruptured disc in the lower plug around the filler pipe and into the formation, and forcing the bomb through the lower movable plug to contact the fixed plug to detonate the bomb and the liquid explosive.

7. A method of increasing the productivity of a formation penetrated by a well comprising the steps of inserting a filler pipe having a projection thereon into the well, inserting into the well a lower movable plug having a passageway therethrough closed by a rupturable disc, depositing a liquid explosive within the well upon the lower movable plug, attaching a bomb to an upper movable plug, inserting the upper movable plug and bomb into the well; forcing the upper movable plug, bomb, and lower plug down the well until the lower movable plug contacts the projection on the filler pipe; rupturing the disc in the lower plug by forcing the lower plug upon the projection on the filler pipe, thereby forcing the liquid explosive to flow around the filler pipe and into the formation, and forcing the bomb through the lower movable plug to contact the projection on the filler pipe to detonate the bomb and the liquid explosive.

8. A method of increasing the productivity of a formation penetrated by a well comprising the steps of inserting a filler pipe having a projection thereon into the well, inserting into the well a lower movable plug having a passageway therethrough closed by a rupturable disc, depositing a liquid explosive within the well upon the lower movable plug, attaching a bomb to an upper movable plug, inserting the upper movable plug and bomb into the well; pumping a flushing fluid on the upper movable plug to force the bomb, and lower plug down the well until the lower movable plug contacts the projection on the filler pipe; rupturing the disc in the lower plug by forcing the lower plug upon the projection on the filler pipe, thereby forcing the liquid explosive to flow around the filler pipe and into the formation, and forcing the bomb through the lower movable plug to contact the projection on the filler pipe to detonate the bomb and the liquid explosive.

9. A method of treating a formation penetrated by a well, comprising the steps of inserting an isolator plug in a well at a desired depth below a formation to be worked, placing a filler pipe upon the isolator plug in the well, placing a lower movable plug into the well, depositing a liquid explosive in the well on top of the lower movable plug, placing an upper movable plug in the well; forcing the upper plug, the liquid explosive, and the lower plug down the well until the lower plug is in the vicinity of the filler pipe; forcing the liquid explosive through the lower plug around the filler pipe and into the well formation; and detonating the liquid explosive.

10. A method of treating a formation penetrated by a well, comprising the steps of inserting an isolator plug in a well at a desired depth below a formation to be worked, placing a filler pipe upon the isolator plug in the well, inserting into the well a fixed plug in contact with the filler pipe, placing a lower movable plug into the well, depositing a liquid explosive in the well on top of the lower movable plug, placing an upper movable plug in the well; pumping a flushing fluid into the well to force the upper plug, the liquid explosive, and the lower plug down the well until the lower plug contacts the fixed plug; forcing the liquid explosive through the lower plug, around the filler pipe and into the well formation; and detonating the liquid explosive.

11. A method of increasing the productivity of a formation penetrated by a well comprising the steps of inserting upper and lower fixed plugs in the well having a filler pipe interposed therebetween; inserting a lower movable plug into the well; inserting a quantity of liquid explosive in the well upon the lower movable plug; inserting an upper movable plug in the well above the liquid explosive; forcing the upper movable plug, liquid explosive and lower movable plug down the well until the lower movable plug contacts the upper fixed plug; forcing the liquid explosive past the lower movable plug, the upper fixed plug, and around the filler pipe; and detonating the liquid explosive.

12. A method of increasing the productivity of a formation penetrated by a well comprising the steps of inserting upper and lower fixed plugs in the well having a filler pipe interposed therebetween inserting a lower movable plug in the well, inserting a quantity of liquid explosive into the well upon the lower movable plug, inserting an upper movable plug having an impact sensitive bomb attached thereto into the well; forcing the upper movable plug, liquid explosive, and lower movable plug down the well until the lower movable plug contacts the upper fixed plug; forcing the liquid explosive through the lower movable plug, past the upper fixed plug, and around the filler pipe; and forcing the bomb through the lower movable plug against the upper fixed plug, thereby detonating the bomb and the liquid explosive.

13. A method of increasing the productivity of a formation penetrated by a well comprising the steps of inserting into a well upper and lower fixed plugs in the well having a filler pipe interposed therebetween; inserting a lower movable plug in the well, inserting a quantity of liquid explosive into the well upon the lower movable plug, inserting an upper movable plug having an impact sensitive bomb attached thereto into the well, filling the well above the upper movable plug with a flushing fluid; pumping the flushing fluid to force the upper movable plug, the liquid explosive, and lower movable plug down the well until the lower movable plug contacts the upper fixed plug, forcing the liquid explosive through the lower movable plug, past the upper fixed plug, and around the filler pipe, and forcing the bomb through the lower movable plug against the upper fixed plug, thereby detonating the bomb and the liquid explosive.

14. A method of increasing the productivity of a formation penetrated by a well comprising the steps of inserting an isolation plug at a desired level in the well, inserting a filler pipe into the well adjacent the isolation plug, inserting a lower movable plug into the well, pouring a liquid explosive into the well upon the lower movable plug, inserting an upper movable plug into the well; forcing the upper plug, liquid explosive, and lower plug down the well until the lower plug contacts the filler piper, forcing the liquid explosive through the lower plug, around the filler pipe and into the formation, and detonating the liquid explosive.

15. A method for increasing the productivity of a formation in a well comprising: inserting a pump-down plug at a desired depth in a well at the bottom of a perforated zone, swabbing the well of excess fluid, inserting a weight supporting plug at a desired depth in the well, inserting a container of liquid explosive into the well and resting it upon the weight supporting plug, inserting a second plug sealing the container to the walls of the well, forcing the container down the well until it reaches the pump-down plug, forcing the liquid explosive from the container into the well formation, and detonating the liquid explosive whereby the formation being permeated by liquid explosive, will be fractured at various places.

16. A method for increasing the productivity of a formation within a well comprising: inserting a bottom plug into a well, lowering the bottom plug to a level below a perforated area in the well adjacent a formation, swabbing the well of surplus well fluids, inserting a weight supporting plug into the well, forcing the weight supporting plug to a desired level, inserting a container having a rupturable disc in its lower end into the well, filling the container with a liquid explosive, inserting a seal into the container over the liquid explosive, forcing the container to the level of the bottom plug, rupturing the disc in the lower end of the container, whereby the liquid explosive is allowed to flow into the formation, and detonating the liquid explosive to cause the fracturing of the formation in all areas permeated by the liquid explosive.

17. A well device comprising a first plug, a pipe attached to the first plug, said first plug having a passageway therethrough in contact with the interior of the pipe, a second plug positioned within the pipe, a rupturable disc attached to the bottom of the pipe and closing the end of the pipe, and a rod slidably mounted on said pipe and positioned opposite the disc, whereby the second plug may force any contents from the pipe after the rod is pushed through the rupturable disc allowing the contents to flow from the pipe.

References Cited by the Examiner

UNITED STATES PATENTS

| | | | |
|---|---|---|---|
| 2,504,611 | 4/50 | Zandmer | 102—22 |
| 2,969,839 | 1/61 | Greene | 161—63 |
| 3,002,454 | 10/61 | Chesnut | 102—21 |
| 3,066,733 | 12/62 | Brandon | 166—36 |
| 3,075,463 | 1/63 | Eilers et al. | 102—21 |
| 3,105,549 | 10/63 | Raulins | 166—63 X |

BENJAMIN HERSH, *Primary Examiner.*

SAMUEL FEINBERG, *Examiner.*